May 5, 1970 R. E. J. GERARD ET AL 3,510,755
DIRECT CURRENT VOLTAGE STABILISERS
Filed Sept. 25, 1967
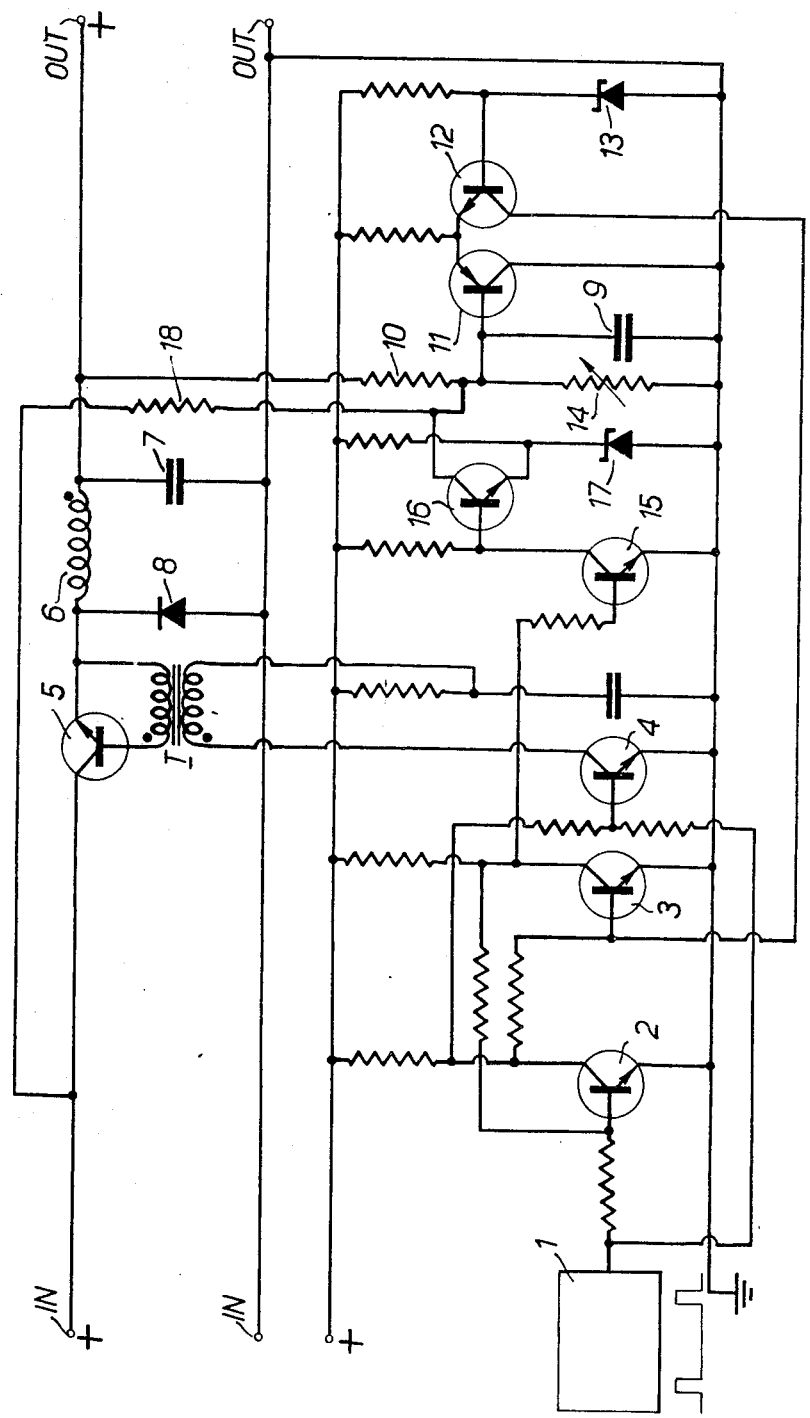
INVENTORS
Roger Edwin John Gerard
and
Thomas James Woodmason
BY Baldwin Wight Diller & Brown ATTORNEYS

United States Patent Office 3,510,755
Patented May 5, 1970

3,510,755
DIRECT CURRENT VOLTAGE STABILISERS
Roger Edwin John Gerard, London, and Thomas James Woodmason, Devon, England, assignors to The Marconi Company Limited, London, England, a British company
Filed Sept. 25, 1967, Ser. No. 670,035
Claims priority, application Great Britain, Oct. 20, 1966, 47,000/66
Int. Cl. G05f 1/56
U.S. Cl. 323—22
10 Claims

ABSTRACT OF THE DISCLOSURE

In switched D.C. stabilisers the switch is normally actuated by a multivibrator of continuously variable mark/space ratio controlled by a comparator which compares the output voltage obtained by charging a timing condenser with a reference voltage. Stabilisers continuously controlling the multivibrator are unstable and complex. In this invention which uses two-state circuits, pulses from a periodic source are applied to trigger a bistable into one of its two states to close the switch. A comparator completes the discharge circuit for the condenser and when voltage from the condenser equals a reference voltage the comparator triggers the bistable to its other state to open the switch.

---

This invention relates to direct current voltage stabilisers i.e. to arrangements whereby the D.C. voltage supplied to a load is automatically stabilised, despite variations in the load and/or in a power supply from which said D.C. voltage is derived, substantially at a predetermined desired value. The stabilised voltage value may, if desired, be adjustable.

More specifically the invention relates to what are herein termed "switched D.C. voltage stabilisers." By "switched D.C. voltage stabiliser" is meant a stabiliser of the known kind in which the output D.C. voltage, obtained by charging a storage condenser, is compared with a reference voltage source and any difference found by that comparison is used to control the operation of a switch, usually constituted by a transistor, which is inserted in the charging circuit of said condenser and which is controlled in such manner that the "mark/space" ratio of the switch i.e. the ratio of the closed to the open times of the switch, is increased in response to a decrease of output voltage, and decreased in response to an increase of said output voltage.

In switched D.C. voltage stabilisers as at present in common use, the switch is actuated, directly or indirectly, by a multi-vibrator of continuously variable mark/space ratio and this ratio is varied continuously under the control of the resultant of the comparison of the output voltage with the reference voltage. Known switched D.C. voltage stabilisers of this nature have the defects of being undesirably complex and expensive because of the need for continuous i.e. progressive control of the multi-vibrator. Moreover they tend to lack stability with time and with variations of ambient temperature because D.C. amplification of the voltage resulting from comparison is usually necessary before it can be satisfactorily employed continuously to vary the mark/space ratio of the multivibrator and D.C. amplifiers are very difficult to make stable with time and with variations of temperature. Moreover, and this is an important practical limitation, the range over which the mark/space ratio of a multivibrator can be varied by a control voltage in a reasonably simple manner is undesirably limited. In fact, unless undesirably complex and special circuit means are provided, the achievable range of variations of the mark/space ratio of a multi-vibrator by a control voltage is, in general, limited to a range of about 30% to 70% and even this range is not easy to achieve. The present invention seeks to avoid the foregoing defects and to provide improved simple and reliable switched D.C. voltage stabilisers which shall be of high stability, shall depend for operation upon component circuits which are, in operation, in one or other of two different states (i.e. "on" or "off" as distinct from being subjected to continuous or progressive control) and shall be capable of control to effect a wide range of variation of mark/space ratio of the switch—theoretically a range extending from 0% to 100% but in practice a range which can be made to extend from 10% to 90% without serious difficulty or expense.

According to this invention a switched D.C. voltage stabiliser comprises a timing condenser, a charging circuit therefore including a switch, a periodic pulse source, means actuated by pulses from said source periodically to set said switch into a pre-determined one of its two states, and means responsive to the occurrence of a pre-determined voltage across said condenser for setting said switch into the other of its two states also returning and said condenser to a pre-determined state of charge.

Preferably the switch is a transistor in series in a charging circuit for the condenser.

An adjustable leak resistance may be connected across the timing condenser.

Preferably pulses from said source are operative to close the switch and voltage from said condenser is fed to a comparator to be compared thereby with a reference voltage, said comparator being arranged to open said switch and to complete a circuit to discharge said condenser down to a voltage which is below said reference voltage when the voltages compared by said comparator reach equality. The voltage down to which the condenser is discharged by the discharging circuit may be approximately zero but preferably it is substantially more than zero but less than the reference voltage.

Preferably again an auxiliary unswitched charging circuit is provided for charging said condenser from input voltage supplied to the stabiliser.

In a preferred arrangement in accordance with the invention pulses from the pulse source are employed both as trigger pulses to trigger a bistable circuit into one of its two states and are also employed to cause closure of the switch, and the attainment of equality of the two voltages compared by the comparator is employed to trigger the bistable circuit to return to the other of its two states and to complete a discharging circuit for the condenser, and return of said bistable circuit to said other of its two states is utilised to cause opening of the switch. The bistable preferably comprises two cross-coupled transistors the first of which has its base fed from the pulse source and the second of which has its base fed with output voltage from the comparator the collector of said first transistor being connected to one end of a resistance the other end of which is connected through a further resistance to the pulse source, the junction of the last mentioned resistances being connected to the base of a switching transistor which actuates a transistor constituting the switch. The comparator consists

3 preferably of two transistors connected as a long-tailed pair with the base of one fed with voltage from the condenser and the other fed with a reference voltage (preferably that due to a Zener diode), the collector of said other transistor being connected to the base of the second bistable transistor. Voltage at the collector of the second bistable transistor is preferably employed to control the state of conductivity of a further transistor which is connected in series with a Zener diode in the discharging circuit across the condenser.

The invention is illustrated in the accompanying drawing which shows diagrammatically one embodiment thereof.

Referring to the drawing, D.C. potential from an unstabilised source (not shown) is applied at input terminals IN and stabilised output potential is taken off at terminals OUT to a load (not shown).

A pulse source 1 of any suitable known kind provides periodic positive-going pulses as indicated conventionally below the block representing the source 1. To quote practical but not limiting figures the pulse repetition frequency might be, say, 100 kc./s. and the length of each pulse 10%, or thereabouts, of the pulse period.

Pulses from the source 1 are applied to the base of a transistor 2 which, with a transistor 3, is connected in a known cross-coupled bistable circuit as shown. The said pulses are also applied to the base of a switching transistor 4. Each pulse, when it arrives, renders transistor 2 conductive (if it is not already in that condition) and also renders transistor 4 conductive. When transistor 2 becomes conductive the bistable remains in the state in which said transistor is conductive until said bistable is switched to its other state (with transistor 2 cut off and transistor 3 conductive) but transistor 4 remains conductive only during the presence of the pulse or when transistor 2 is cut-off. When transistor 4 conducts it operates by means of a transformer T to cut off a transistor 5, which constitutes a switch in series in the line between the "live" input and output, i.e. to open the switch constituted by said transistor 5. When, at the end of a pulse from the pulse source 1, transistor 4 cuts off, it renders transistor 5 conductive i.e. it closes the switch. Smoothing filter elements 6 and 7 and a diode 8 are provided and connected as shown as in known switched D.C. voltage stabilisers.

When switch 5 closes, charging current is fed through a resistor 10 to a timing condenser 9. The voltage across this condenser is applied to the base of a transistor 11 which is one transistor of a voltage comparator comprising the two transistors 11, 12 connected as a long-tailed pair. The voltage on the base of the transistor 12 is supplied from a reference voltage source which may be adjustable to permit the value of voltage at which the output at OUT is stabilised to be adjusted. In the arrangement illustrated the reference voltage is provided by a Zener diode 13 and adjustment of the value at which the output voltage at OUT is stabilised is obtainable by adjusting a resistor 14 connected across the condenser 9.

When the voltage at the base of transistor 11 reaches equality with that at the base of transistor 12, the latter conducts. This renders transistor 3 conducting thus changing the state of the bistable, causing transistor 4 to conduct and open the switch 5 to break the charging current circuit for the condenser 9. When transistor 3 conducts it cuts off a transistor 15 which in turn renders a transistor 16 conductive to discharge the condenser 9 down to a pre-determined voltage which is determined by a fixed voltage source constituted by a Zener diode 17 in the discharge current circuit. The discharge voltage limit set by the diode 17 must of course be below the voltage of the reference source diode 13. As will be apparent the less the difference between the voltages of the diodes 13 and 17 the higher will be the degree of stabilisation obtained in the output voltage at OUT.

In the preferred arrangement illustrated there is an auxiliary unswitched charging circuit for the condenser 9 from the "live" input terminal through the resistance 18. This provides for the condenser 9 a supplementary charging current which increases with increase in the input voltage and accordingly provides an added degree of stabilisation against increases in input voltage.

The generator or pulse source 1 may be locked in frequency e.g. to an A.C. source (not shown) of fixed pre-determined frequency. "Ripple frequency" disturbance in the stabilised output D.C. voltage and disturbance due to radiation from parts of the stabiliser—notably from the transformer T and/or from the choke 6—will occur mainly at a frequency determined by that of the source 1 and by locking the frequency of said source 1 at a known value such disturbance will be caused to be mainly at this known frequency. This is an advantage in many applications of the stabiliser.

We claim:

1. A switched D.C. voltage stabiliser comprising a timing condenser, a charging circuit therefor, a switch in series with said charging circuit, a periodic pulse source, means actuated by pulses from said source to close said switch and means for feeding voltage from said condenser to a comparator to be compared thereby with a reference voltage, said comparator being arranged to open said switch and to complete a circuit to discharge said condenser down to a voltage which is below said reference voltage when the voltages compared by said comparator reach substantial equality.

2. A stabiliser as claimed in claim 1 wherein said switch is a transistor.

3. A stabiliser as claimed in claim 1 wherein an adjustable leak resistance is connected across said timing condenser.

4. A stabiliser as claimed in claim 1 wherein the voltage down to which the condenser is discharged by the discharging circuit is approximately zero.

5. A stabiliser as claimed in claim 1 wherein an auxiliary unswitched charging circuit is provided for charging said condenser from input voltage supplied to the stabiliser.

6. A stabiliser as claimed in claim 1 wherein the voltage down to which the condenser is discharged by the discharging circuit is substantially more than zero but less than the reference voltage.

7. A device as claimed in claim 1 wherein the comparator consists of two transistors connected as a long-tailed pair with the base of one fed with voltage from the condenser and the other fed with a reference voltage, the collector of said other transistor being connected to the base of the second bistable transistor.

8. A device as claimed in claim 1 wherein pulses from the pulse source are employed both as trigger pulses to trigger a bistable circuit into one of its two states and are also employed to cause closure of the switch, and the attainment of substantial equality of the two voltages compared by the comparator is employed to trigger the bistable circuit to return to the other of its two states and to complete a discharging circuit for the condenser, and return of said bistable circuit to said other of its two states is utilised to cause opening of the switch.

9. A device as claimed in claim 8 wherein the bistable comprises two cross-coupled transistors the first of which has its base fed from the pulse source and the second of which has its base fed with output voltage from the comparator the collector of said first transistor being connected to one end of a resistance the other end of which is connected through a further resistance to the pulse source, the junction of the last mentioned resistance being connected to the base of a switching transistor which actuates a transistor constituting the switch.

10. A device as claimed in claim 9 wherein voltage at the collector of the second bistable transistor is employed to control the state of conductivity of a further transistor which is connected in series with a Zener diode in the discharging circuit across the condenser.

References Cited

UNITED STATES PATENTS

| | | | |
|---|---|---|---|
| 3,213,351 | 10/1965 | Walker | 323—22 X |
| 3,281,652 | 10/1966 | Perrins | 323—22 X |
| 3,305,767 | 2/1967 | Beihl et al. | |
| 3,419,736 | 12/1968 | Walsh | 307—293 |

J D MILLER, Primary Examiner

G. GOLDBERG, Assistant Examiner

U.S. Cl. X.R.

307—246, 293, 297; 323—38